United States Patent
Ivanescu et al.

(10) Patent No.: US 6,713,025 B1
(45) Date of Patent: Mar. 30, 2004

(54) LIGHT-OFF AND CLOSE COUPLED CATALYST

(75) Inventors: Cornel Ivanescu, Dearborn Heights, MI (US); Guy R. Desrochers, Bloomfield Hills, MI (US); Keith C. Ingermann, West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/396,569

(22) Filed: Sep. 15, 1999

(51) Int. Cl.$^7$ .............................. B01D 53/94; F01N 3/20
(52) U.S. Cl. ...................... 422/177; 422/171; 422/180
(58) Field of Search ............................... 422/171, 177, 422/180; 60/299, 302

(56) References Cited

U.S. PATENT DOCUMENTS

| | | | |
|---|---|---|---|
| 3,017,255 A | 1/1962 | Norris | 422/180 |
| 3,189,418 A * | 6/1965 | Gary | 422/171 |
| 3,644,098 A | 2/1972 | De Palma et al. | 422/176 |
| 3,899,300 A | 8/1975 | D'Olier | 422/177 |
| 3,927,525 A | 12/1975 | Jacobs | 60/302 |
| 4,775,518 A * | 10/1988 | Abthoff et al. | 422/177 |
| 5,103,641 A * | 4/1992 | Maus et al. | 422/171 |
| 5,144,800 A | 9/1992 | Shioya et al. | 60/299 |
| 5,220,789 A | 6/1993 | Riley et al. | 422/180 |
| 5,351,483 A | 10/1994 | Riley et al. | 60/302 |
| 5,692,373 A | 12/1997 | Atmur et al. | 60/302 |
| 5,693,295 A * | 12/1997 | Foster | 422/171 |
| 5,857,328 A | 1/1999 | Blanchet et al. | 422/180 |
| 5,881,553 A | 3/1999 | Steenackers et al. | 60/299 |
| 5,881,554 A | 3/1999 | Novak et al. | 60/302 |
| 5,996,339 A * | 12/1999 | Gottberg et al. | 422/180 |

FOREIGN PATENT DOCUMENTS

GB 1455351 * 11/1976

* cited by examiner

*Primary Examiner*—Hien Tran
(74) *Attorney, Agent, or Firm*—Thomas A. Jurecko

(57) ABSTRACT

A light-off and close coupled catalyst assembly for a motor vehicle is provided. The assembly includes a plurality of conically shaped catalysts disposed adjacent to the exhaust ports of a combustion engine. The assembly also includes a main brick catalyst disposed downstream of the conically shaped catalysts. The main brick catalyst includes an angled front face and a conically shaped downstream end.

4 Claims, 4 Drawing Sheets

LIGHT-OFF AND CLOSE COUPLED CATALYST

BACKGROUND OF THE INVENTION

1. Technical Field

The present invention relates in general to a motor vehicle exhaust system. More particularly, the present invention relates to a catalytic exhaust treatment in a motor vehicle. More specifically, but without restriction to the particular embodiment and/or use which is shown and described for purposes of illustration, the present invention relates to an exhaust system having a series of catalytic converters disposed near the exhaust port of an internal combustion engine.

2. Discussion

Many years ago, the exhaust systems of automobiles consisted entirely of a pipe that attached to the exhaust ports of the combustion chamber of an internal combustion engine via a manifold. The major function of the pipe was to allow a controlled path for the hot exhaust gases to flow away from the engine and passenger compartments of the vehicle. Subsequently, mufflers were added to the rearward portion of the exhaust pipe to muffle the pulsating sounds of the exhaust gases to an acceptable level. In the mid 1970's, a typical exhaust system also included a catalytic converter to remove pollutants from the exhaust gases. At first, all catalytic converters were disposed a substantial distance downstream of the exhaust ports in order to more effectively control the temperature of the catalyst.

Traditional 3-way, Carbon Monoxide-Hydrocarbon-Nitric Oxide, catalysts that are used on automobiles may not operate effectively at low or very high temperatures. At low temperatures, the catalyst does not convert the three main pollutants to Carbon Dioxide, Water, Nitrogen, and Oxygen. In fact, the typical catalyst is wholly ineffective until the catalyst heats up. The time needed for the catalyst to heat up is directly proportional to the distance between the catalyst and the engine. This is due primarily to the amount of structure (pipe walls, etc.) that the exhaust gases come in contact with before the catalyst. These surfaces act as a thermal mass and, in effect, reduce the temperature of the exhaust gas it as it moves downstream. In a downstream position, a typical catalyst could take as much as two minutes to heat up to an effective operating temperature. Therefore, the majority of the pollutants that the engine produces in the first two minutes would pass through the catalyst and emitted to the atmosphere. Unfortunately, if a catalyst operates at a temperature above a defined maximum, the catalyst will tend to age faster or even melt, thereby making it necessary to change catalysts. Therefore, placing the catalyst in the downstream position, significantly away from the exhaust ports, was a necessity.

Automotive engineers saw the need to provide catalysts that could heat up quicker and many improvements followed over the years, such as low mass substrates and close coupled catalysts. The low mass substrates provided for minimal thermal loss caused by the catalyst, thereby decreasing the needed heat-up time. Close coupled catalysts are, by definition, doser to the engine, and consequently, closer to the heat source. The improvements made to catalyst systems over the years have allowed for the catalyst to be placed closer to the exhaust port without being in danger of over-heating the catalyst. Examples of close coupled systems are described in U.S. Pat. Nos. 5,351,483 and 4,151,717. Many other systems have been proposed to decrease heat up time for the catalyst system, such as adding a heating element to the catalyst. However, such a solution has not been effective compared to the close coupled catalyst when cost and performance are considered.

The desire to reduce heat up time for an automotive catalyst has created a need to provide unique placement and arrangements of catalysts that effectively promote conversion of pollutants, especially in the first few minutes of engine operation.

SUMMARY OF THE INVENTION

Accordingly, it is a principal objective of the present invention to provide an effective catalyst configuration and arrangement for a motor vehicle.

It is another objective of the present invention to provide a catalyst configuration that reduces the amount of pollutants that escape through the exhaust system.

It is yet another objective of the present invention to provide a catalyst configuration that can reduce the amount of time needed for catalyst light-off to occur, i.e. the time needed to heat the catalyst to an appropriate operating temperature.

It is a further objective of the present invention to provide a catalyst configuration that can be packaged effectively in the engine compartment without affecting other components.

In one form, the present invention provides a catalyst configuration for a motor vehicle having an engine with a plurality of exhaust ports that carry exhaust gases from the combustion chamber of the engine. The exhaust gases leave the combustion chamber and flow in a downstream direction by first entering the exhaust ports. The exhaust gas from the exhaust ports then enters a plurality of tubes extending from a shell, the shell also includes an exit portion that decreases in diameter in the downstream direction. Each tube includes a conically shaped catalyst disposed adjacent to the exhaust port. The conically shaped catalysts have a front face and a rear face, said rear face being larger than said front face. The conically shaped catalysts also include cells that vary in size, the cell size increases in the downstream direction. The conically shaped catalysts are constructed from a metal substrate.

The shell encloses a main brick catalyst. The main catalyst is substantially cylindrical in shape and disposed downstream from the plurality of conically shaped catalysts. The main brick catalyst includes an angled front face and a conical downstream end. The downstream end has a conically shaped formation that decreases in diameter in the downstream direction at a rate greater than the rate at which the exit portion of the shell decreases in the downstream direction. The main catalyst brick is preferably constructed of a ceramic substrate. An exhaust pipe is attached to the exit portion of the shell and extends substantially to the rear of the vehicle.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be read in conjunction therewith, and like reference numerals are employed to designate identical components in various views.

DETAILED DESCRIPTION OF THE PREFERRED EMBODIMENT

Figure 1:
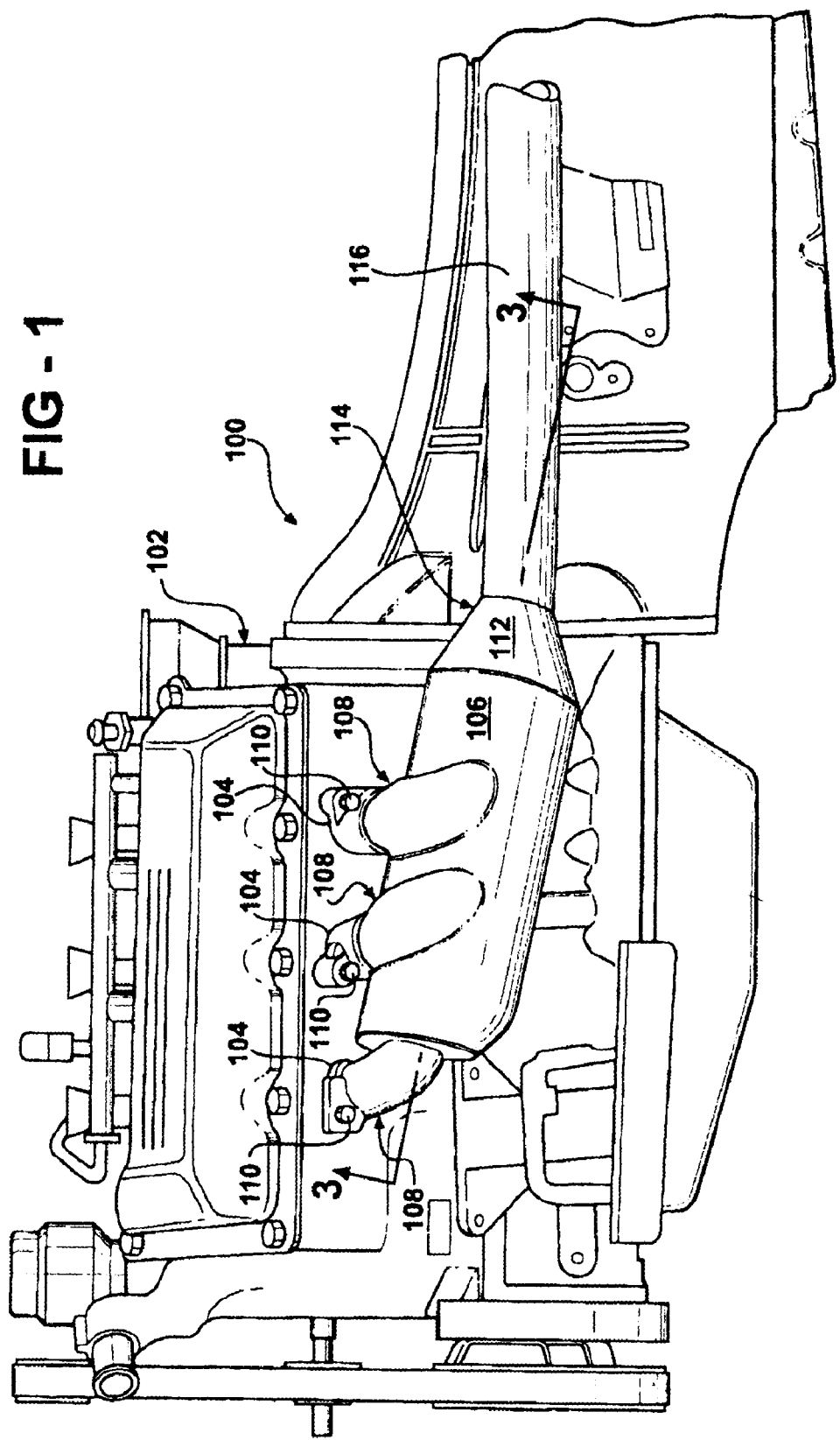
FIG. 1 is a side view of the catalyst system of the present invention, in a six cylinder V-configuration engine.

Referring now to the drawings, there is depicted a catalyst system illustrating the present invention. With reference to FIG. 1, the catalyst system of the present invention is designated generally by numeral 100. Catalyst system 100 is shown attached to an engine 102 at exhaust ports 104. The exhaust ports 104 of engine 102 are employed to allow hot gases to be expelled out of the combustion chamber of the engine. Catalyst system 100 includes a shell 106 enclosing the main portion of the catalytic elements. A plurality of hollow tubes 108 extend from the shell 106 and attach to the engine 102, preferably via bolts 110. The tubes 108 attach to the engine 102 at the exhaust ports 104 such that the tubes 108 circumscribe the exhaust ports 104 so that all fluids that exit the exhaust ports 104 enter the tubes 108. It should be appreciated that the number of tubes 108 correspond to the number of exhaust ports 104 in one region of the engine 102. For example, the engine 102 of FIG. 1 includes six exhaust ports, however, only three exhaust ports 104 are visible. The other three exhaust ports are disposed on the other side of the engine 102 and lead into another set of tubes, that are, again not shown because their illustration is blocked by the engine 102. It should be appreciated that the orientations on both sides of the engine 102 are substantially identical so only one will be described subsequently in detail.

Figure 2:
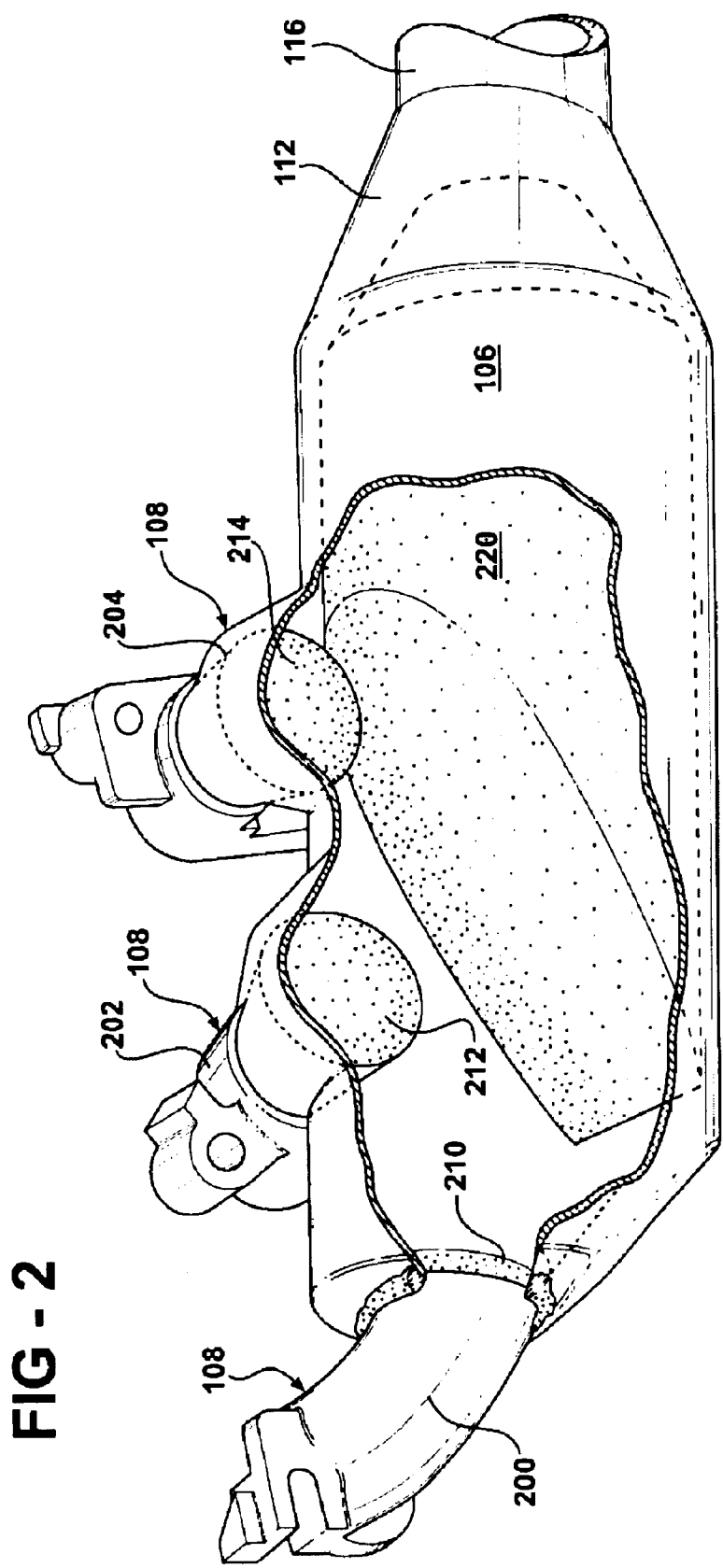
FIG. 2 is a side view of the catalyst system of the present invention having a portion of the shell removed for illustration purposes.

The shell 106 includes an exit portion 112 disposed at the downstream end 114 thereof. The exit portion 112 leads to an exhaust pipe 116 that runs longitudinally with the vehicle and preferably exits near the back end thereof. FIG. 2 illustrates the catalyst system 100 with the engine 102 removed from illustration. FIG. 2 also includes a portion of the shell 106 cut away so that a section of the internal thereof can be illustrated. The tubes 108 of the preferred embodiments shown in FIG. 2 can be more particularly identified as forward-most 200, medal 202, and rearword 204. Each tube 200, 202, and 204 includes a conically shaped catalyst inserted therein. The forward-most tube 200 includes a forward-most conical catalyst 210, the medial tube 202 includes a medial conical catalyst 212, and the rearward-most tube 204 includes a rearward-most conical catalyst 214. The specific shape and orientation of the catalysts 210, 212, and 214 shall be discussed subsequently in detail. Shell 106 houses a main catalyst brick 220 which extends substantially to the exhaust pipe 116.

Figure 3:
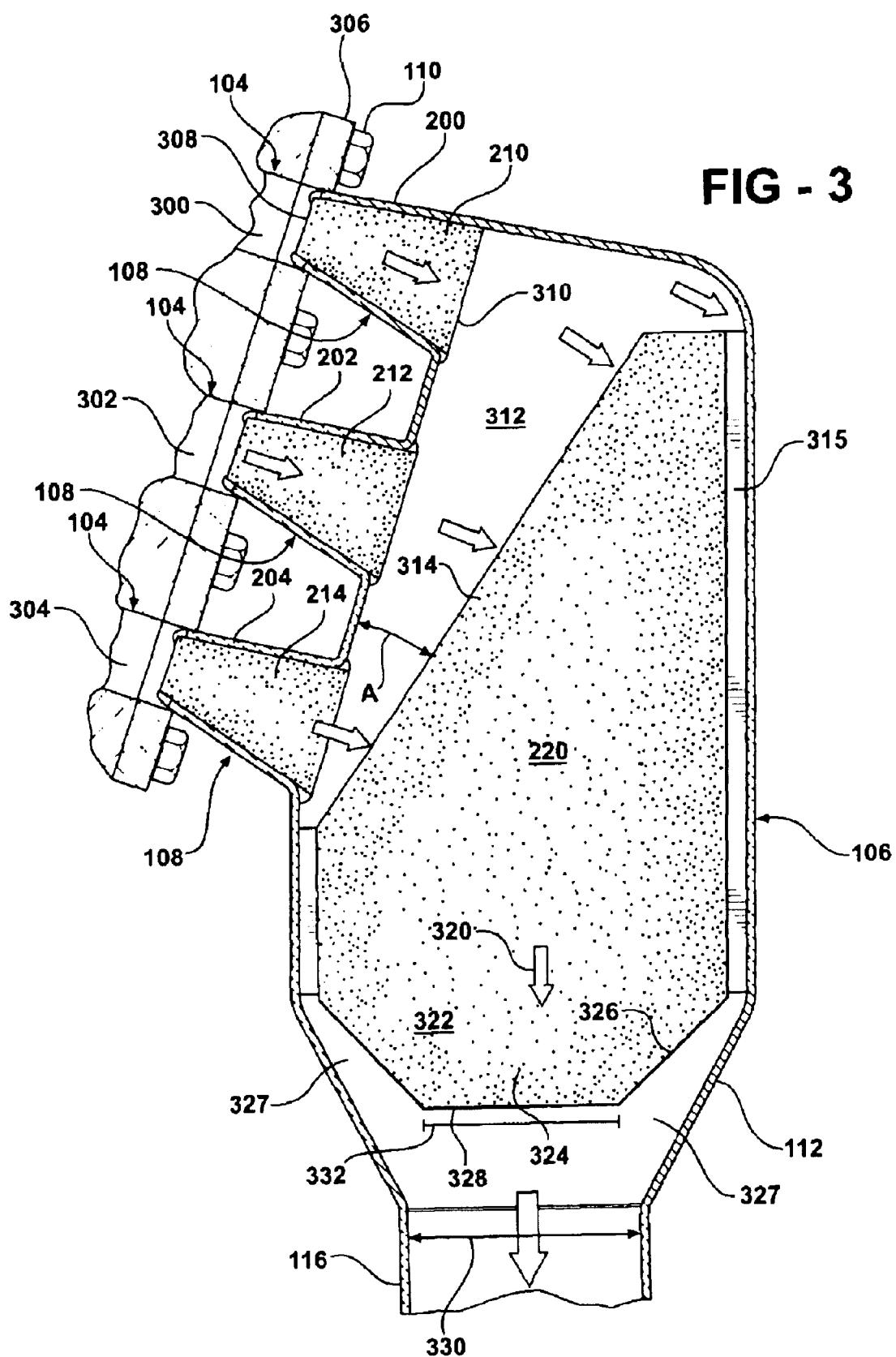
FIG. 3 is a cross-sectional view of the catalyst system of the present invention along the line 3—3 of FIG. 1.

Now turning to FIG. 3, a first embodiment of the present invention is illustrated by a cross sectional view of the catalyst system 100. The three exhaust ports 104 are depicted with more particularity by numerals 300 for the forward-most port, 302 for the medial port, and 304 for the rearward-most port. Tubes 200, 202, and 204 include a flange 306 at their upstream end for mating reception of the bolts 110. For the sake of illustration, up-stream will be considered as a location that is more closely situated to the exhaust ports 104 of the engine 102. The conical shape of the conical catalysts 210, 212, and 214 can be more fully appreciated from the cross sectional view of FIG. 3. Most typical automotive catalysts consist of a substrate, typically ceramic or metallic that is coated with precious metals that lower the activation energy of at least one of the following reactions: the oxidation of hydrocarbons, the oxidation of carbon monoxide, and the reduction of nitric oxides. Most automotive catalysts are loaded with some combination of Platinum, Palladium, and Rhodium depending on the specific application. The substrate, whether it be metallic or ceramic, has cells or flow passages formed therethrough. In a standard catalyst, each cell maintains a constant cross section throughout the catalyst. The size of the cell is defined as the cross sectional area of each passageway defined in a direction perpendicular to exhaust gas flow. The conical catalysts 210, 212, and 214 are preferably constructed from a metallic substrate. Metallic substrates are capable of varying the size of the cell depending on the construction method thereof. Therefore, for example, conical catalyst 210 includes a front face 308 having a defined surface area and a defined number of cells. The cell size is therefore calculated by dividing the surface area by the number of cells. At the rear face 310 of the conical catalyst 210 the surface area increases but the number of cells remains constant, thereby increasing the cell size or cell cross sectional area at the rear face 310. The greater the cells per square inch the greater the surface area available for which catalytic material can be bonded. Therefore, providing a conically shaped catalyst allows for more catalytic conversion at the front face 308 of conical catalyst 210. This allows for a quicker light-off not only because catalyst is extremely close to the heat source but also because the exhaust gases are concentrated onto a small front face 308 of the conical catalyst 210.

The rear face 310 of the conical catalyst is disposed within an open chamber 312 within the shell 106. The chamber 312 promotes mixing and thermal equilibrium. The exhaust gas flow from the rear face 310 is directed towards the main catalyst brick 220. The main catalyst brick is, preferably, generally cylindrical in shape and having an angled front face 314. The brick is surrounding on its exterior surfaces by a conventional mat 315 that is disposed between the brick 220 and the shell 106. Front face 314 is angled such that the front face 314 is closer to the rearward-most catalyst 214 than it is to the forward-most catalyst 210. It should be appreciated that the the angled front face 314 and the portion of the shell that is adjacent to the tubes 108 from the angle referred to as 'A' in FIG. 3. In this embodiment, the angle chosen is 18 degrees, this amount provides benefits both in catalyst package and exhaust gas mixing. The main catalyst brick 220 is preferably constructed from a ceramic substrate having a constant cell size. It should be appreciated that the cells are oriented in the direction of flow indicated by arrow 320 and that the cells maintain a constant cross sectional area throughout the brick. Cross sectional area is defined perpendicular to the longitudinal flow path. Toward the downstream portion of the main catalyst brick 220 a conical portion 322 is formed. The conical portion 322 has a middle section 324 that extends downstream further than the side sections 326. The side sections 326 are angled inward at a greater degree than the degree by which the exit portion 112 of the shell 106 is angled inward, thereby providing an area 327 that increases in the downstream direction. It should be appreciated that the middle section 324 hag an exit surface 328 that is perpendicular to the gas exhaust flow of the system and is slightly smaller in diameter 332 than the exit pipe 116 whose diameter is referenced by numeral 330.

Figure 4:
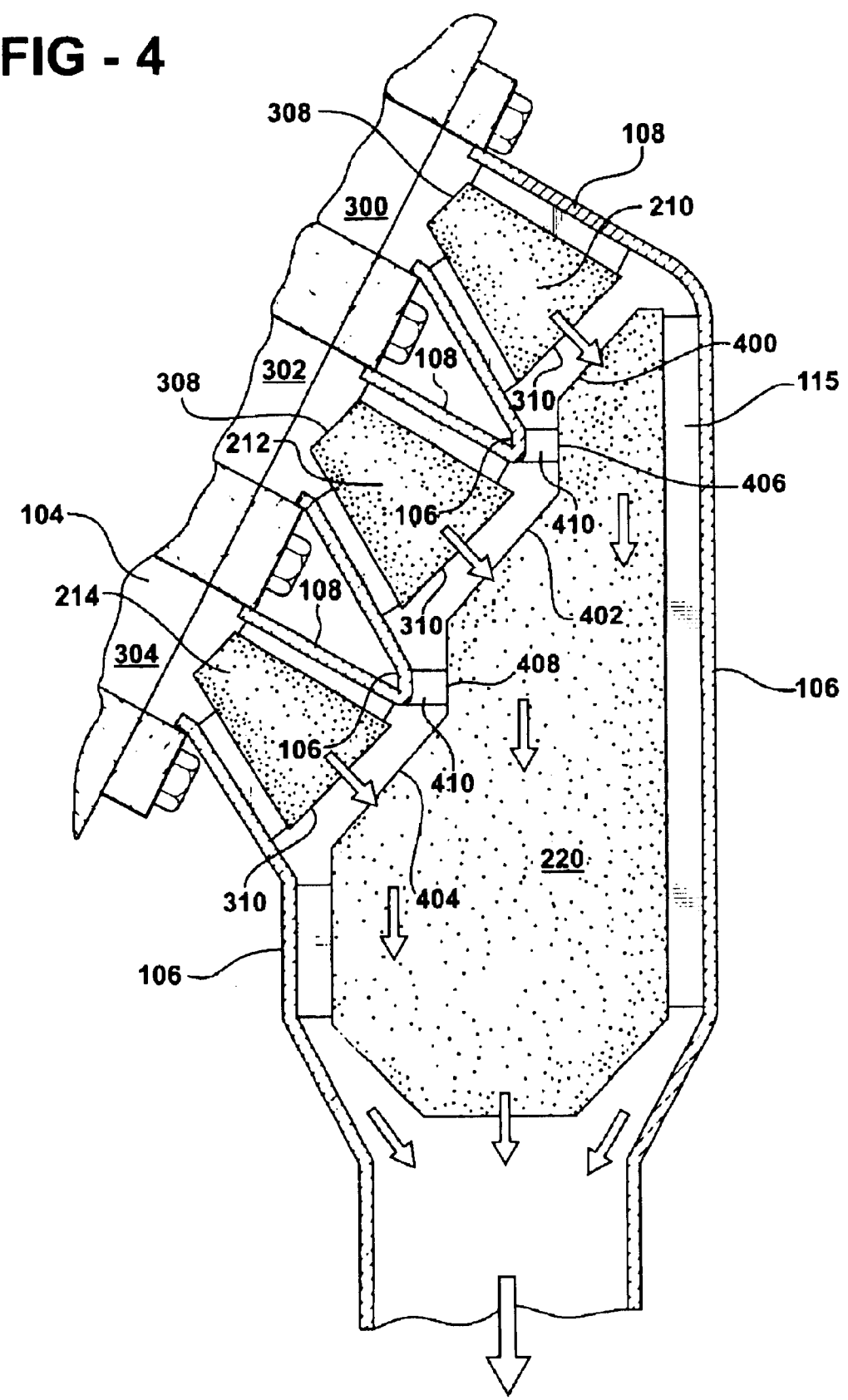
FIG. 4 is a cross sectional view of a second embodiment of the catalyst system of the present invention

FIG. 4 illustrates a second embodiment of the present invention. The general construction is some what similar to that described in detail in the first embodiment, therefore, only the differences will be described in detail. The main catalyst brick 220 in the second embodiment includes a plurality of angled surfaces 400, 402, and 404 at its upstream end. The number of angled surfaces corresponds to the number of exhaust ports 104 of the engine 102 in that particular region or side of the engine 102. Each angled surface 400 402, and 404 is substantially parallel with the rear surface 310 of the conical catalysts 210, 212, and 214. The main catalyst brick 220 include surfaces that are parallel with the flow of exhaust gases 320 that interconnect the angled surfaces. Surface 406 interconnects angled surface 400 and 402 and surface 108 interconnects angled surface 402 and 404. Surfaces 406 and 408 include a flow restrictor 410 extending therefrom and abutting the shell 106 between the tubes 108. Flow restrictors 410 limit mixing within open chamber 312 and direct the exhaust gas flow from the conical catalysts 210, 212, and 214 to the main catalyst brick 220.

While the above description constitutes the preferred embodiment of the invention, it will be appreciated that the invention is susceptible to modification, variation, and change without departing from the proper scope or fair meaning of the accompanying claims.

What is claimed is:

1. A catalyst system for a motor vehicle having an engine with an exhaust port that carries exhaust gases away from the combustion chamber of the engine, wherein the exhaust gases leave the combustion chamber and flow in a downstream direction by first entering the exhaust port, said catalyst system comprising:

a shell with at least one conduit extending therefrom and including a downstream end and an exit portion having a diameter formed on the downstream end, the exit portion decreases in diameter in the downstream direction;

a conically shaped catalyst disposed contiguous to the exhaust port of the engine and including cells having a cross sectional area, the cross sectional of at least one of the cells of said conically shaped catalyst increases in the downstream direction; and a main brick catalyst having an angled front face disposed downstream of said conically shaped catalyst, wherein said main brick catalyst includes a downstream end having a conically shaped formation having a diameter, said diameter of said conically shaped formation decreases in the downstream direction at a rate greater than the rate at which said exit portion of said shell decreases in diameter in the downstream direction, wherein the shell encloses the main brick catalyst and the at least one conduit houses the conically shaped catalyst and the at least one conduit is attached to the engine and circumscribes the exhaust port when attached, and wherein said conically shaped catalyst includes a rear face disposed at an acute angle from said angled front face of said main brick catalyst.

2. A catalyst system for a motor vehicle having an engine with a plurality of exhaust ports that carry exhaust gases away from the combustion chamber of the engine, wherein the exhaust gases leave the combustion chamber and flow in a downstream direction by first entering the exhaust ports, said catalyst system comprising:

a shell with a plurality of conduits extending therefrom and including a downstream end and an exit portion having a diameter formed on the downstream end, the exit portion decreasing in diameter in the downstream direction;

a plurality of conically shaped catalysts disposed contiguous to the exhaust ports of the engine; and a main brick catalyst having a front face that includes a plurality of angled surfaces, wherein each of the plurality of angled surfaces is disposed downstream of a respective one of said plurality of conically shaped catalysts, wherein said main brick catalyst includes a downstream end having a conically shaped formation having a diameter, said diameter of said conically shaped formation decreases in the downstream direction at a rate greater than the rate at which said exit portion of said shell decreases in diameter in the downstream direction, and wherein the shell houses the main brick catalyst and the plurality of conduits house the plurality of conically shaped catalysts and the plurality of conduits are attached to the engine and circumscribe the exhaust ports when attached.

3. A catalyst system for a motor vehicle having an engine with a plurality of exhaust ports that carry exhaust gases from the combustion chamber of the engine, wherein the exhaust gases leave the combustion chamber and flow in a downstream direction by first entering the exhaust ports, said catalyst system comprising:

a plurality of conically shaped catalysts disposed contiguous to the plurality of exhaust ports of the engine, said plurality of conically shaped catalysts have a front face and a rear face, said rear face being larger than said front face, each of said plurality of conically shaped catalysts also include a metal substrate and a plurality of cells that vary in size, said cell size increasing in the downstream direction;

a shell that includes a plurality of tubes extending therefrom, each of said plurality of tubes receive a respective one of said plurality of conically shaped catalysts, said shell includes an exit portion that decreases in diameter in the downstream direction and said plurality of tubes are attached to the engine and circumscribe the exhaust ports;

a main brick catalyst disposed within said shell, said main brick catalyst is substantially cylindrical in shape and disposed downstream from said plurality of conically shaped catalysts, said main brick includes an angled front face and a downstream end, said downstream end has a conically shaped formation that decreases in diameter in the downstream direction at a rate greater than the rate at which said exit portion of said shell decreases in the downstream direction, said main catalyst brick includes a ceramic substrate; and an exhaust pipe attached to said exit portion of said shell.

4. The catalyst system as set forth in claim 3, wherein said main brick catalyst includes a plurality of angled surfaces interconnected by at least one surface parallel to the exhaust gas flow through said main catalyst brick.

\* \* \* \* \*